(12) United States Patent
Aurongzeb et al.

(10) Patent No.: US 9,335,787 B2
(45) Date of Patent: May 10, 2016

(54) ELIMINATING TILTING OF LAPTOP DEVICES

(71) Applicant: Dell Products L.P., Round Rock, TX (US)

(72) Inventors: Deeder M. Aurongzeb, Round Rock, TX (US); B. Bryce Busby, Round Rock, TX (US); Andrew Thomas Sultenfuss, Leander, TX (US)

(73) Assignee: Dell Products, L.P., Round Rock, TX (US)

( * ) Notice: Subject to any disclaimer, the term of this patent is extended or adjusted under 35 U.S.C. 154(b) by 298 days.

(21) Appl. No.: 13/959,148

(22) Filed: Aug. 5, 2013

(65) Prior Publication Data
US 2015/0036289 A1    Feb. 5, 2015

(51) Int. Cl.
*G06F 1/16* (2006.01)
*H05K 5/00* (2006.01)
*H05K 7/00* (2006.01)
*A47B 91/00* (2006.01)
*B23P 25/00* (2006.01)
*H04M 1/00* (2006.01)
*B29L 31/00* (2006.01)

(52) U.S. Cl.
CPC .............. *G06F 1/1601* (2013.01); *G06F 1/166* (2013.01); *G06F 1/1616* (2013.01); *G06F 1/1679* (2013.01); *B29L 2031/00* (2013.01); *Y10T 29/49885* (2015.01)

(58) Field of Classification Search
CPC ....... G06F 1/16; G06F 1/1616; G06F 1/1679; G06F 1/1601; G06F 1/166; H05K 5/00; B29C 45/00; Y10T 29/49885
USPC ..................... 361/679.55, 679.59, 680, 683; 248/346.03, 682, 683, 687, 917; 29/458, 592, 592.1; 455/575.1, 575.8
See application file for complete search history.

(56) References Cited

U.S. PATENT DOCUMENTS 7,450,373 B2 *  11/2008  Lee et al. ................. 361/679.55
2010/0002379 A1 *  1/2010  Hadad et al. ............. 361/679.59

FOREIGN PATENT DOCUMENTS

CN           201827607 U   *   5/2011

* cited by examiner

*Primary Examiner* — Courtney Smith
*Assistant Examiner* — Zhengfu Feng
(74) *Attorney, Agent, or Firm* — Isidore PLLC

(57) ABSTRACT

A base support structure eliminates tilting of laptops and similar user devices. The base support structure comprises at least one back foot and at least one front foot that is constructed using a first material bonded to a second material. The first material has at least one cavity and is designed to provide a contact mechanism designed to withstand an impact of a touch screen interaction force and/or a radial force when opening or accessing the display. The contact mechanism secures the laptop to a solid surface on which the laptop is placed with at least a first amount of force. The front foot/feet and the back foot/feet are attached to a base housing of a base segment of the laptop and separated by a relative spacing pre-determined to enable enhanced stability of the laptop.

20 Claims, 9 Drawing Sheets

ELIMINATING TILTING OF LAPTOP DEVICES

BACKGROUND

1. Technical Field

The present disclosure generally relates to information handling systems (IHS) and in particular to positional stability of information handling systems.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the increasing popularity of touch screen interaction devices, an increasing number of operating systems are being developed and released as touch screen solutions. For example, Windows™ 8 is becoming a prominent OS utilized in portable IHSes, such as laptops and ultrabooks. Windows™ 8 provides a touch screen solution to the OS, which is expected to become the preferred solution in upcoming user devices. One drawback to the use of touch screen interfaces with laptops and ultrabooks is that while the other functional components of the devices are trending towards being smaller and lighter for greater portability and other benefits, display screen, which is manufactured with glass remains comparatively heavy. Usability studies indicate that some laptops tilt backwards during touch interaction with the display screen due to the weight imbalance attributable to the weight of the glass display screen. As a result, laptop designers are challenged to resolve this serious usability issue associated with the transition of these portable IHSes to an OS touch screen system/solution.

BRIEF SUMMARY

Disclosed is a base support structure that eliminates tilting of laptops. The base support structure comprises at least one back foot and at least one front foot. The front foot/feet and the back foot/feet are attached to a base housing of a base segment of the laptop and are separated from each other by a relative spacing pre-determined to enable enhanced stability of the laptop. The base segment is connected by one or more hinges to the top segment which includes a display of the laptop. The at least one front foot is constructed using a first material bonded to a second material. The first material has at least one cavity and the at least one front foot is designed to provide a contact mechanism designed to withstand an impact of a touch screen interaction force and/or a radial force when opening or accessing the display. The contact mechanism secures the laptop to a solid surface on which the laptop is placed.

According to a second aspect of the disclosure, a front foot for the base support structure is designed by molding into the first material at least one cavity, with each cavity configured to be a particular size and located at specific respective locations distributed within the first material in order to support a front foot design that can provide at least a pre-determined amount of suction/adhesive force placed on the solid surface with at least a first amount of force. In addition, the second material is bonded to the first material using an injection molding procedure, and the second material has a specific level of "softness" and/or pliability which provides enhanced surface area contact with the solid surface when a downward force is applied to the enhanced front foot.

Additional aspects of the disclosure provide an information handling system that includes the base support structure and a method for designing and/or manufacturing the base support structure and/or an information handling system that includes the base support structure.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
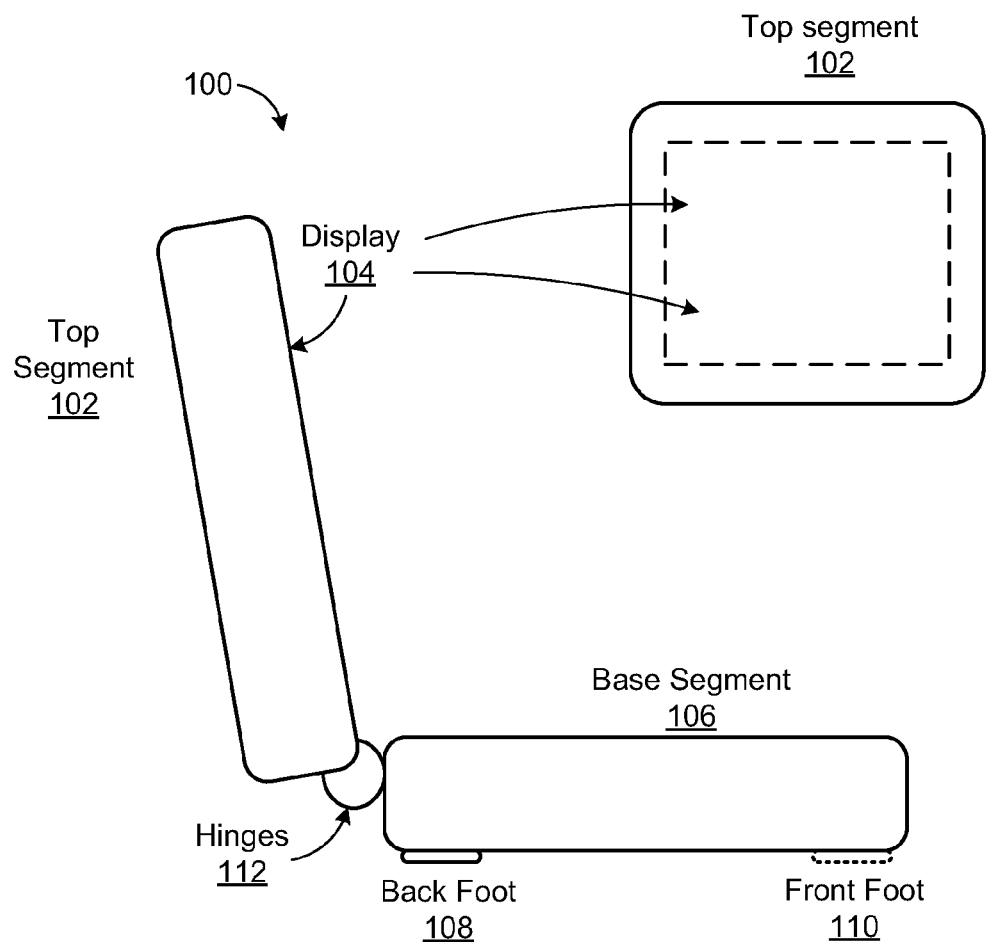
FIG. 1 illustrates an example information handling system (IHS) within which various aspects of the disclosure can be implemented, according to one or more embodiments.

The illustrative embodiments provide a base support structure that eliminates tilting of laptops and similar user devices. The base support structure comprises at least one back foot and at least one front foot. The front foot/feet and the back foot/feet are attached to a base housing of a base segment of the laptop and separated by a relative spacing pre-determined to enable enhanced stability of the laptop. The at least one front foot is constructed using a first material bonded to a second material. The first material has at least one cavity and is designed to provide a contact mechanism designed to withstand an impact of a touch screen interaction force and/or a radial force when opening or accessing the display. The contact mechanism secures the laptop to a solid surface on which the laptop is placed.

In the following detailed description of exemplary embodiments of the disclosure, exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes top segment 102, which includes display 104, and base segment 106, which is physically connected to top segment 102 via one or more hinges 112. In the example of FIG. 1, IHS 100 can represent an IHS having a touch screen display, and can be one of a laptop, ultra book, or other type of user device that is susceptible to tilting due to contact with the display. A user is able to use a minimum rotational force to rotate top segment 102 about hinges 112 and away from base segment 106 to provide a direct, unobstructed view of display 104 and enable touch access to a screen of display 104. Base segment 106 can include electronic components and circuitry, such as processor and memory, etc. (not shown), that enable operation of IHS 100. As illustrated, base segment 106 and/or IHS 100 is physically supported by at least one front foot 110 and at least one back foot 108, which feet 108, 110 are affixed to a lower surface of base segment 106. Front foot 110 is shown as dashed lines to indicate that the at least one front foot 110 is constructed using an enhanced design, in one or more embodiments. The feet are specially designed to provide a contact mechanism that secures IHS 100 to a solid surface (not explicitly shown) on which the IHS 100 is placed.

The contact mechanism provides at least one of an adhesive force and a suction force of a pre-determined minimum value, which enables the at least one front foot 110 of the IHS 100 to remain in contact with the solid surface. The amount of force also enables IHS 100 to withstand an impact of at least one of (a) a touch interaction force applied to a surface of the display and (b) a radial force (e.g., radial force 606 of FIG. 6) used to rotate the top segment 102 away from the base segment 106 to provide viewing and touch interaction access to a user. The force provided by the contact mechanism enables IHS 100 to withstand the touch interaction force and/or the radial force while accounting for a weight of the top segment relative to a weight of the base segment.

Figure 2:
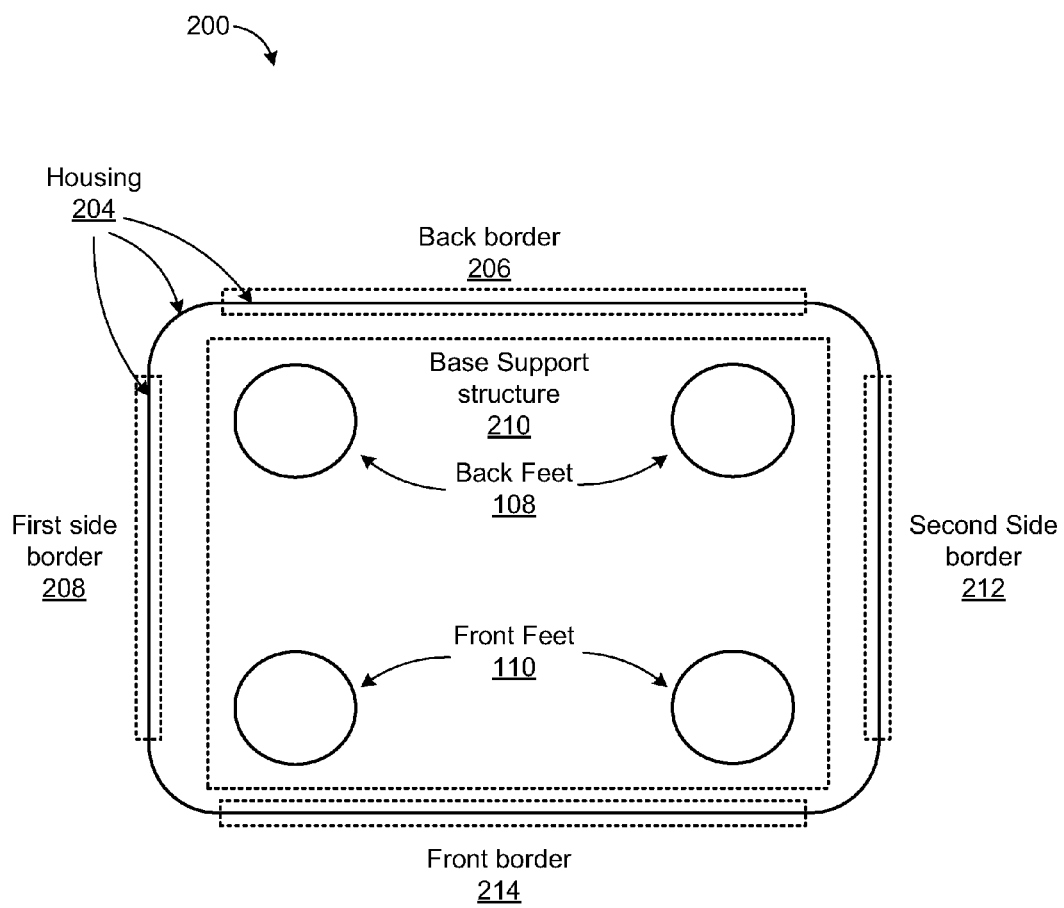
FIG. 2 illustrates a block diagram representation of bottom view of a base support structure for supporting and stabilizing an IHS, in accordance with one or more embodiments.

With specific reference now to FIG. 2, there is depicted a block diagram representation of a bottom view of a base support structure for supporting and stabilizing IHS 100, according to one embodiment. Bottom view 200 shows the positions of the front and back feet 110, 108 of IHS 100 relative to each other and relative to the different borders or perimeter sections of base segment 106. Bottom view 200 comprises housing 204 which is an enclosure of base segment 106 and which represents an external periphery for the various border sections of base segment 106. For discussion purposes, the different border sections include back border 206, front border 214, first side border 208 and second side border 212. Also shown in bottom view 200 is base support structure 210 which comprises back feet 108 and front feet 110 which are all affixed to base segment 106 via an adhesive, or screw, or other fastener. According to one aspect, the back feet 108 and front feet 110 can be arranged using a pre-calculated, specific relative spacing to enable the base support structure to minimize tilting of IHS 100 during use of IHS 100 and particularly the touch screen display 104.

The at least one front foot 110 is positioned within close proximity of the front border 214 and away from the one or more hinges. In one embodiment, the front feet 110 comprises a first front foot and a second front foot which are positioned within close proximity of the first side border 208 and the second side border 212, respectively, and within a pre-determined close proximity of the front border 214. The second front foot is substantially identically constructed as the first front foot. Each of the front feet 108 are designed to respectively provide a first suction force or a first adhesive force with the solid surface that is, in at least one embodiment, greater than a second suction force or a second adhesive force corresponding to the at least one back foot 108. The back feet 108 are positioned within close proximity of the back border 206 and away from the front border 214.

Figure 3:
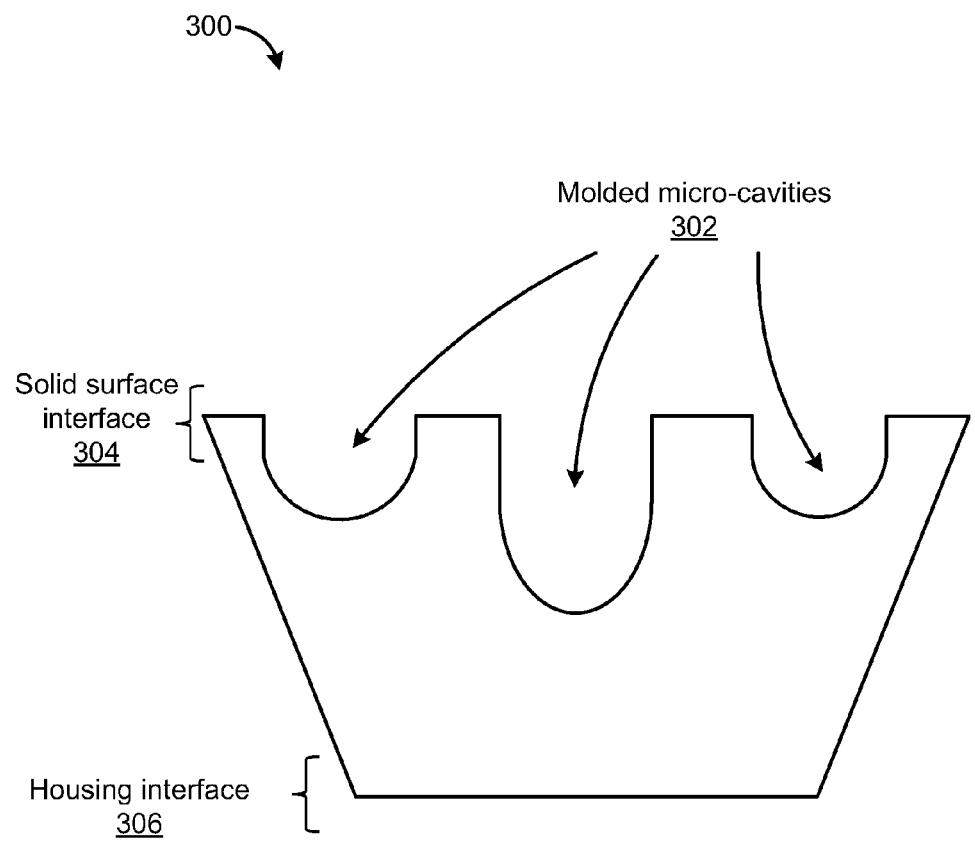
FIG. 3 is an illustration of a molded first material used to construct a front foot utilized within the base support structure for an IHS, according to one embodiment.

FIG. 3 is an illustration of a molded first material used to construct a front foot utilized within the base support structure for IHS 100, according to one embodiment. Mold 300 comprises multiple molded micro-cavities 302. In addition, mold 300 comprises a first interface illustrated as solid surface interface 304 and a second interface illustrated as housing interface 306. Solid surface interface 304 is the surface at which the foot connects with a surface on which a connected IHS is placed, and housing interface 306 is the surface at which the foot is adhesively (or otherwise) affixed to the IHS.

Construction of the front foot is performed by using a manufacturing process to inject a first material used to construct the front foot into a mold. The mold shapes the first material and creates one of a single large scale cavity and multiple molded micro-cavities 302 within the shaped first material (i.e., mold 300), according to the pre-determined front foot design.

Figure 4A:
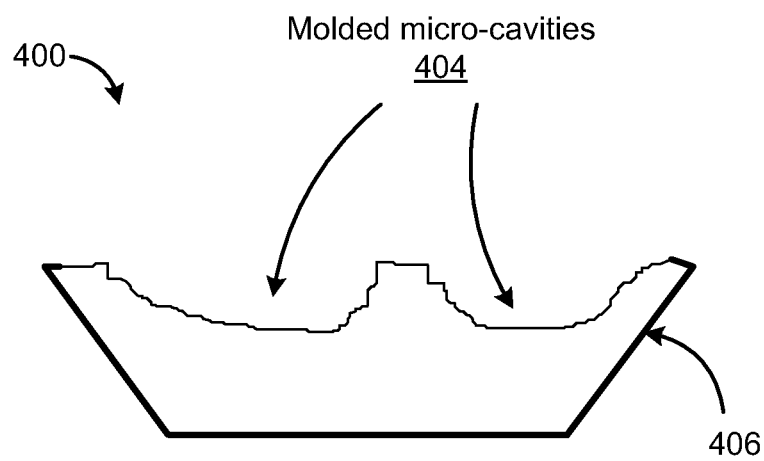
FIG. 4A is another illustration of a molded first material used to construct a front foot utilized within the base support structure for an IHS, according to one embodiment.

FIG. 4A is another illustration of a molded first material used to construct a front foot utilized within the base support structure for IHS 100, according to one embodiment. Mold 400 comprises multiple molded micro-cavities 404. In addition, mold 400 comprises hardened surface interface 406.

Similar to the process used to provide mold 300 described in FIG. 3, a manufacturing process shapes the first material and creates one of a single large scale cavity and multiple micro-cavities within the shaped first material, according to the pre-determined front foot design. However, mold 400 further illustrates the result of heating an exterior surface (i.e., hardened surface 406) of the shaped first material to provide enhanced foot durability. In particular, the manufacturing process applies a heat treatment to a first segment on an exterior surface of the molded first material to harden the first segment of the exterior surface. The hardened exterior surface is thus prepared to interface with an under surface of base segment 106 of IHS 100.

Figure 4B:
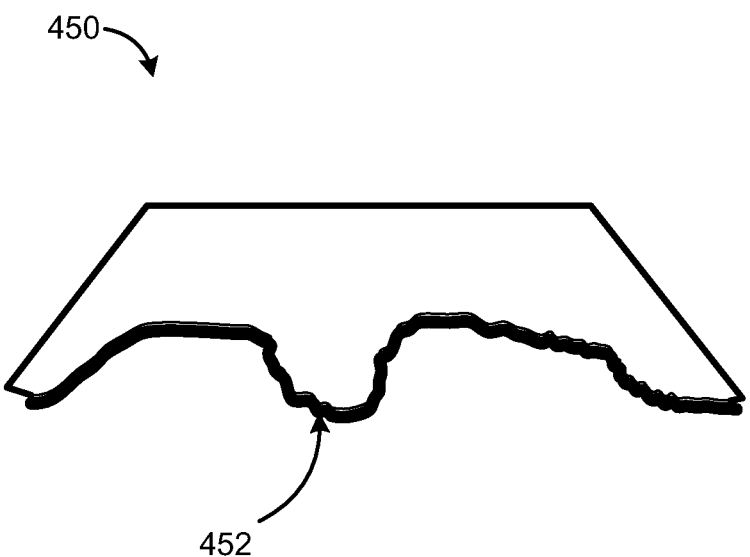
FIG. 4B is an illustration of a molded front foot having a silicon over-mold, according to one embodiment.

FIG. 4B is an illustration of a molded front foot having a silicon over-mold, according to one embodiment. The manufacturing process includes coating a second segment (i.e., the opposing surface to the hardened exterior surface 406) of the molded first material (i.e., mold 400) with a softer or more pliable, second material 452, which can be a silicon surface, in one embodiment. Mold 450 thus comprises soft silicon surface (452) applied to mold 400 of FIG. 4A. When mold 450 is affixed to HIS 100, the pliable second material 452 enables or provides enhanced surface area contact with a solid surface upon which IHS 100 is placed. In one embodiment, the first material 406 is one of a plastic and/or a rubber material, and is positioned against the housing surface of base segment 106, and the second material 452 is silicon. In one or more embodiments, the silicon material (452) is treated or hardened to provide enhanced durability.

In another embodiment, the second material is a tactile polymer that coats the first material and provides an adhesive surface that has a pre-determined level of "softness" and/or pliability to enable contact with the solid surface using a specific minimum surface area to support enhanced adhesion when a downward force is applied to the enhanced front foot. The tactile polymer can, in one embodiment, be implemented using polymer brushes. The tactile polymer enables the corresponding front foot to attain at least a pre-determined minimum adhesive force with a solid surface upon which IHS 100 is placed. Front foot 110 is designed having an overall size and weight to enable front foot 110 to attain at least the pre-determined minimum suction or adhesive force with the solid surface.

Figure 5:
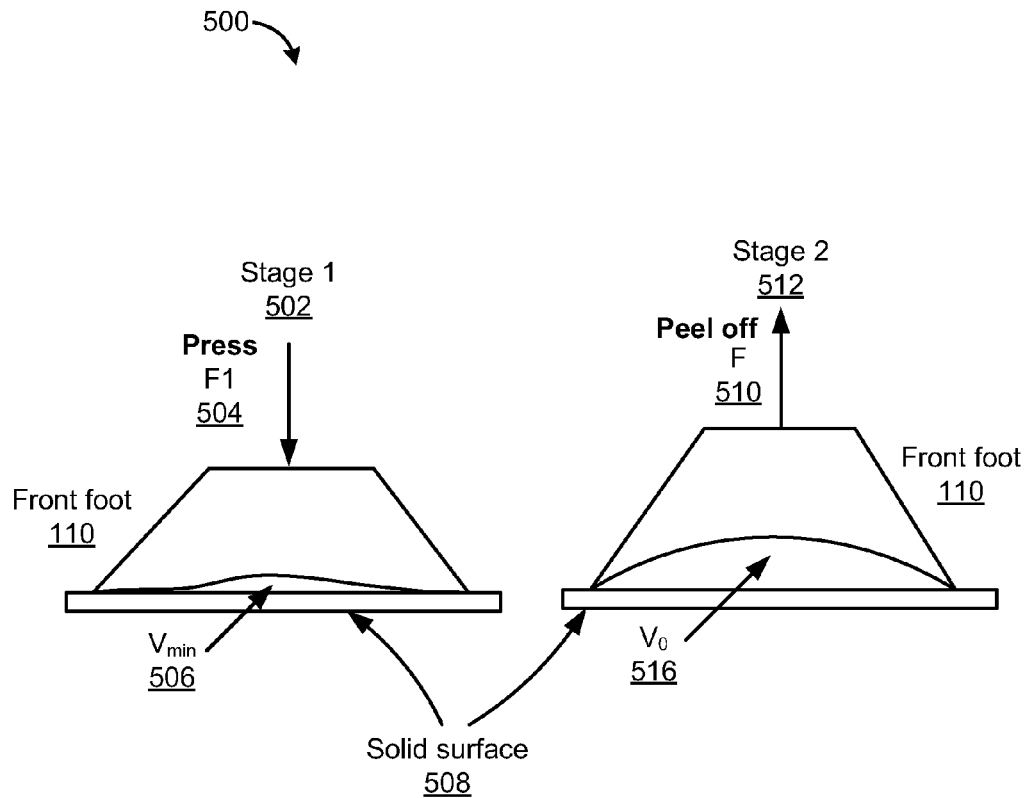
FIG. 5 is an illustration of an enhanced foot with a large scale cavity constructed to provide an enhanced contact mechanism for securing an IHS to a solid surface, according to one embodiment.

FIG. 5 is an illustration of an enhanced foot (which operates as a stabilizing foot) with a large scale cavity constructed to provide an enhanced contact mechanism for securing an IHS to a solid surface, according to one embodiment. In particular, FIG. 5 provides two stages including "stage 1" 502 in which (front) foot 110 is being pressed onto the solid surface 508 and "stage 2" 512 in which front foot 110 is being pulled away from the solid surface 508.

At "stage 1" 502, pressing force "F1" 504 is applied to front foot 110 in order to trigger a suction force that secures front foot 110 to solid surface 508. Pressing force F1 504 is large enough to reduce the volume of the large scale cavity to a minimum cavity volume $V_{min}$ 506 which is maintained by a corresponding suction force provided by the enhanced design of front foot 110.

At "stage 2" 512, "peel off" or pulling force "F" 510 is applied to front foot 110 in order to detach front foot 110 from solid surface 508. Pulling force F 510 is large enough to increase the volume of the large scale cavity to a larger or maximum cavity volume $V_0$ 516 which approaches the volume of the cavity that can be achieved when the pulling force F 510 equals the (maximum) suction force provided by the enhanced design of front foot 110.

Pulling force F 510 or maximum suction force provided by the enhanced design of front foot 110 can be calculated using Equation 1 which is:

$$"F=P(1-V_{min}/V_0)*A",$$

where P is the pressure of the air/fluid within the cavity associated with the application of pressing force f1, $V_{min}$ is the minimum cavity volume, $V_0$ is the maximum cavity volume, and A is the area of the base of front foot 110.

Figure 6:
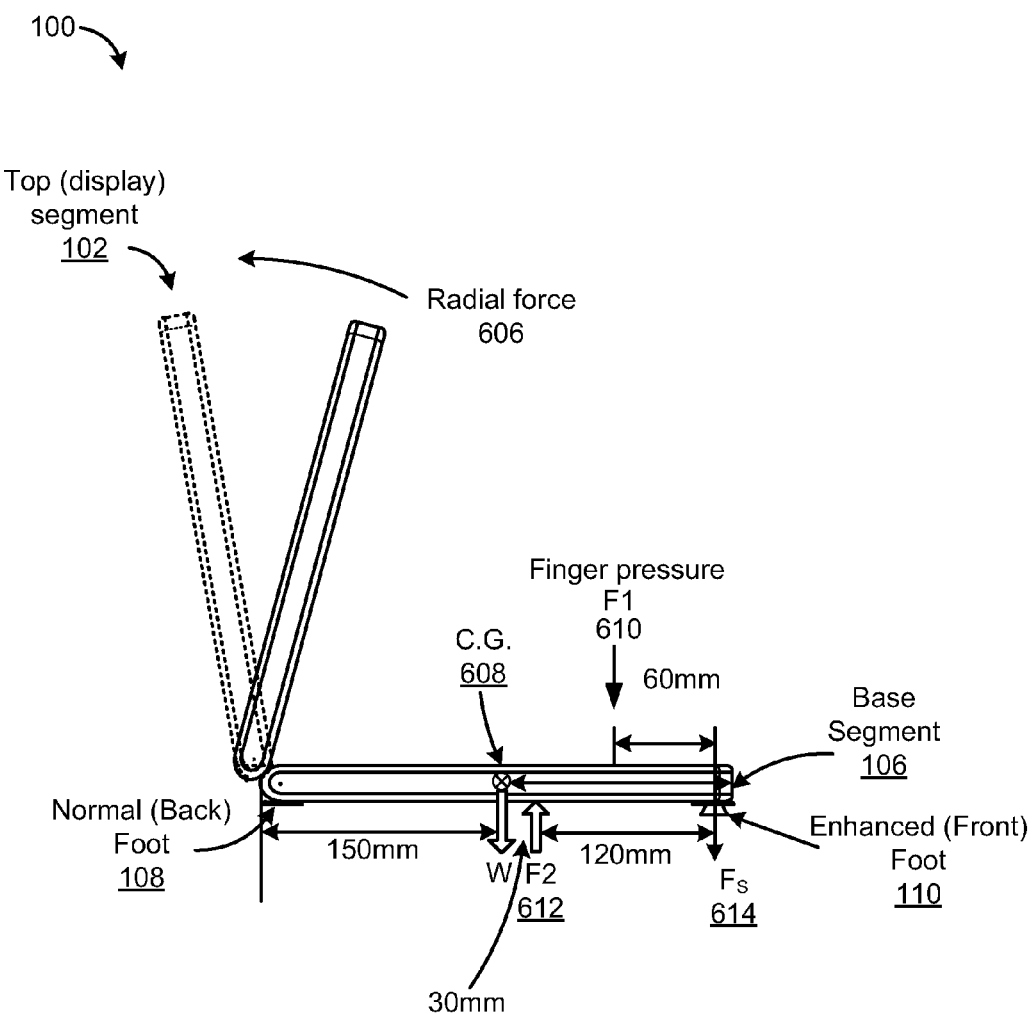
FIG. 6 is a block diagram illustrating an IHS with front feet designed to provide enhanced suction or adhesion with a solid surface, according to one embodiment.

FIG. 6 is a block diagram illustrating IHS 100 with attached enhanced front feet that is designed to provide enhanced suction or adhesion with a solid surface, according to one embodiment. FIG. 6 has similar physical components as FIG. 1 and is described with reference to these previously-described components of FIG. 1. Enhanced front foot 100 can be designed with one or both of a suction cup and/or tactile polymer, in alternate embodiments. IHS 100 comprises top (display) segment 102 and base segment 106. IHS 100 also includes "normal"/back foot 108 and enhanced front foot 110. Also illustrated in FIG. 6 are a number of forces impacting IHS 100 by user interaction associated with IHS 100. In particular, radial force 606 represents a force provided when a user rotates top segment 102 away from base segment 106 in order to enable viewing or touch interaction access to the display 104. Force "F1" 610 is a stabilizing force associated with radial force 606 and results from a user-provided finger pressure at an upper surface of base segment 106 to help stabilize IHS 100 while radial force 106 is being applied. "G.C" 608 represents a center of gravity of IHS 100, which is the location at which the weight "W" of the IHS 100 is applied for calculations of force and moment. G.C. 608 can shift away from a central position (as illustrated) on IHS 100 and towards back foot 108 as top segment 102 is rotated further away from base segment 106. Also illustrated is force "F2" 612 which is an upward force on base segment 106 as a result of radial force 106 being applied at top segment 102. F2 612 is determined from radial force 106 by accounting for a weight of top segment 102. Fs 614 is one of an adhesive force and a suction force provided by enhanced front foot 110. As shown by the horizontal, bi-directional arrows, each force is being applied at a specific linear distance away from normal (back) foot 108.

The moment (i.e., a force multiplied by a perpendicular distance from a pivot) can be calculated for each of the forces associated with either stabilizing or de-stabilizing IHS 100 to determine a level of suction force or adhesive force that is required to maintain device stability and prevent IHS 100 from tilting. In particular, F2 612 represents the de-stabilizing force, and F2 units of force*180 mm is equal to the corresponding net anti-clockwise moment about the pivot at "normal" foot 108. On the other hand, "W" (at G.C 608), F1 610 and Fs 614 represent respective stabilizing forces. W*150+ F1*240+Fs*300 is equal to the corresponding net clockwise moment about the pivot at "normal" foot 108. IHS 100 does not tilt as long as the net clockwise moment is not exceeded by the net anti-clockwise moment. For IHS 100, "W" is known. An average, average range, and/or an average maximum for each of forces F2 and F1 can be empirically determined. Thus, given these known values and/or range of values for the associated forces, in the example of FIG. 6, Fs can be calculated using the following equation: Fs>=(F2*100−W*150− F1*240)/300. In one embodiment, Fs represents the pre-determined minimum suction/adhesive force that enhanced foot 110 is designed to provide when IHS 100 is placed on a solid surface and corresponding front foot 110 makes adequate contact with the solid surface.

During and/or as a result of touch screen interaction by a user, another radial force can be provided at the display of top segment 102. This touch screen interaction force may be substantially smaller than the radial force used to rotate top segment 102 away from base segment 106. In most instances in which a touch screen interaction force is being applied, force F1 610 is not applied by the user (and F1 is set to "0" in the above equation) when or while the touch screen interaction force is being applied. In this case, Fs can be similarly calculated by substituting an empirically determined value for F2 112. In this case, F2 112 results from a second type of radial force provided by touch screen interaction force instead of from a radial force (e.g., radial force 606) that is intended to rotate top segment 102 about hinges 112.

Figure 7:
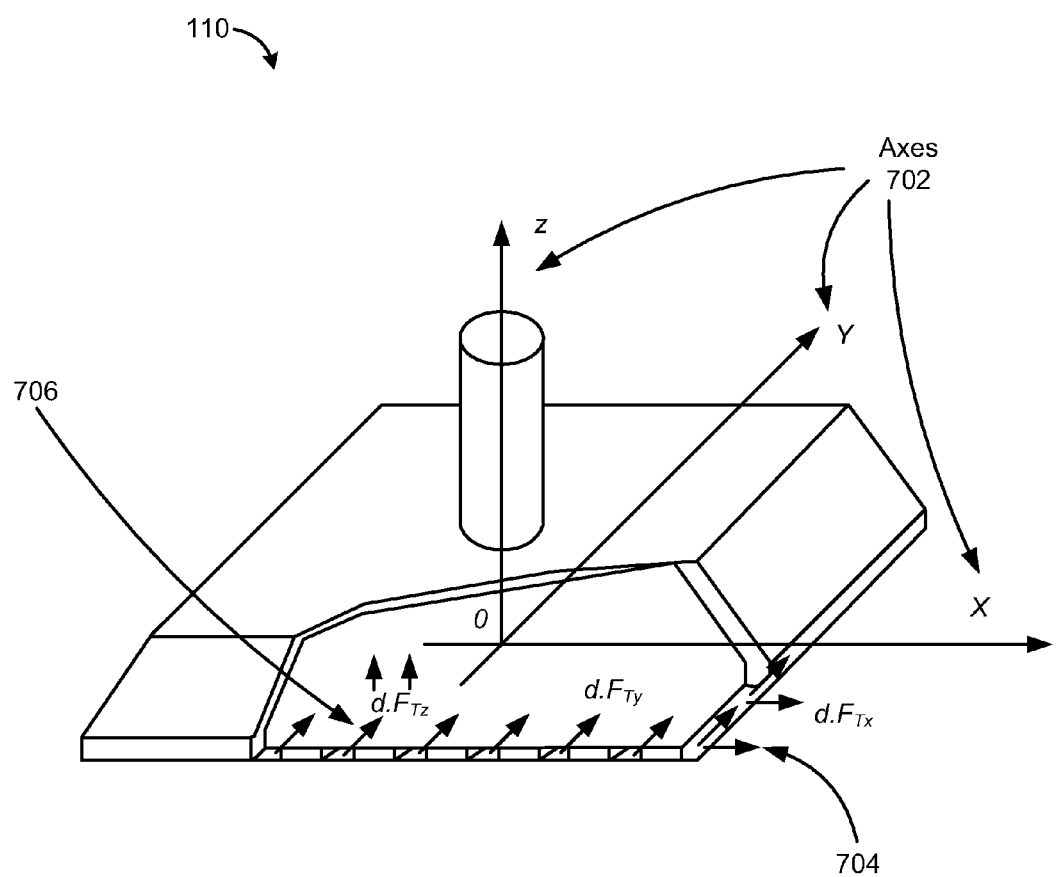
FIG. 7 is a block diagram of an example molded front foot illustrating forces that can be applied to detach the foot from a solid surface, according to one embodiment.

FIG. 7 is a block diagram illustrating forces that can be applied to detach from a solid surface an enhanced foot providing enhanced suction or adhesion to the solid surface, according to one embodiment. In enhanced foot structure 110, x-axis, y-axis and z-axis are collectively illustrated as axes 702. Enhanced foot structure 110 can be detached from a solid surface using a sideways force as opposed to a vertical force. The sideways force would not directly oppose a suction force or an adhesive force provided by an enhanced foot structure 110. Furthermore, the sideways force is significantly less that a suction force or an adhesive force provided by an enhanced foot structure 110. For example, as illustrated, first force $dF_{fx}$ 704 which is directed along the x-axis and/or second force $dF_{fy}$ 706 which is directed along the y-axis are respectively smaller than the corresponding suction force or an adhesive force provided by enhanced foot structure 110 and can be used to detach IHS 100 from a solid surface. In particular, first force $dF_{fx}$ 704 and/or second force $dF_{fy}$ 706 creates a gradual release of the corresponding suction force as the edges of the suction cup are moved away from solid surface 508.

Figure 8:
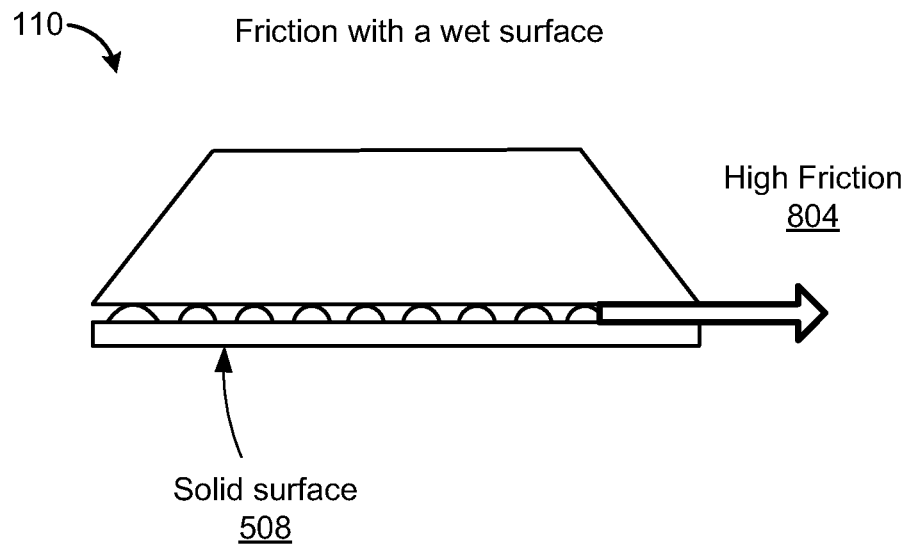
FIG. 8 is a first block diagram of an example molded front foot illustrating forces that can be applied to detach the foot from a wet and solid surface, according to one embodiment.

FIG. 8 is a first block diagram of an example molded front foot illustrating forces that can be applied to detach the foot from a wet and solid surface, according to one embodiment. Enhanced foot 110 is designed using multiple micro-cavities and is secured using at least one of a suction force and an adhesive force to wet and solid surface 508. Because of the design involving the multiple molded micro-cavities, a sliding force that exceeds high friction force 804 is required to detach foot 110 from wet and solid surface 508.

Figure 9:
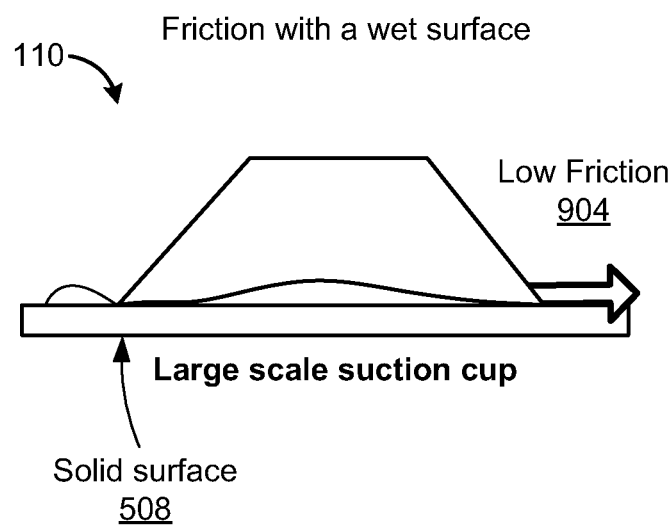
FIG. 9 is a second block diagram of an example molded front foot illustrating forces that can be applied to detach the foot from a wet and solid surface, according to one embodiment.

FIG. 9 is a second block diagram of an example molded front foot illustrating forces that can be applied to detach the foot from a wet and solid surface, according to one embodiment. Enhanced foot 110 is designed using a large single cavity suction cup and is secured using at least one of a suction force and an adhesive force to wet and solid surface 508. Because of the design involving the large scale single cavity suction cup, a sliding force that exceeds low friction force 904 (which is less than high friction force 804 of FIG. 8) is required to detach foot 110 from wet and solid surface 508.

Those of ordinary skill in the art will appreciate that the hardware and basic configuration thereof depicted in FIGS. 1-9 may vary. The illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 10:
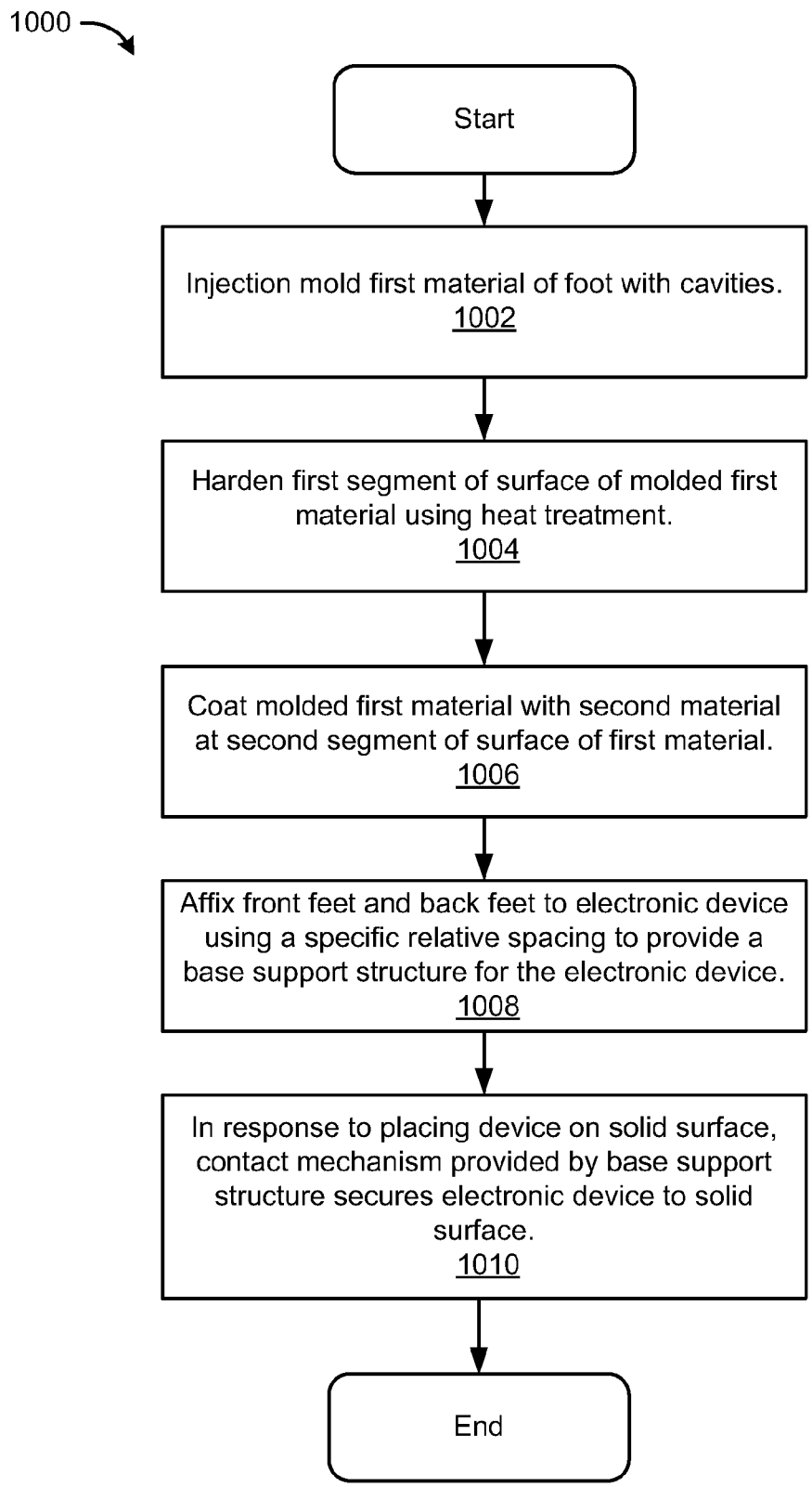
FIG. 10 is a flow chart illustrating an example method for manufacturing a base support structure to minimize tilting of an IHS, according to one embodiment.

FIG. 10 presents a flowchart illustrating an example method for manufacturing an IHS that is configured to prevent tilting, according to one or more embodiments of the disclosure. More specifically, FIG. 10 illustrates an example method for manufacturing a base support structure to minimize and/or prevent tilting of an IHS. The description of the method is provided with general reference to the specific components illustrated within the preceding figures. In the discussion of FIG. 10, reference is also made to elements described in FIG. 1-FIG. 9.

Method 1000 begins at the start block and proceeds to block 1002 where a manufacturing process involves determining a design of a front foot (for an IHS) that provides a pre-determined minimum suction force or adhesive force that secures the IHS onto a solid surface upon which the IHS can be placed. Using an injection mold of the design of the front foot, a manufacturing process injects a first material used to construct the front foot into a mold which shapes the first material and creates one of (i) a single large scale cavity or (ii)

multiple micro-cavities within the shaped first material, according to the pre-determined front foot design (block 1004). In particular, the manufacturing process creates within the first material at least one cavity. Each cavity is configured to be a particular size and at specific respective locations distributed within the first material in order to support a front foot design that can provide at least the pre-determined minimum amount of suction/adhesive force with the solid surface. The manufacturing process applies heat treatment to a first (outer) segment of the molded first material which is designed to interface with housing 204 of IHS 100 to harden the first segment (block 1006). The manufacturing process, using the injection mold, coats a second segment (i.e., where the one or more cavities are located) of the molded first material with a softer, second material to increase surface area contact (block 1008). The manufacturing process respectively affixes the constructed front foot/feet and at least one back foot to IHS 100 while separating the front feet from the back feet by a relative spacing pre-determined to enable enhanced stability of the laptop. The front feet and the back feet arranged using the relative spacing which is pre-determined to provide the base support structure that minimizes tilting of IHS 100 (block 1010). The process then ends at end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS), comprising:
    a top segment which includes a display of the IHS;
    a base segment which has a base housing and is connected by one or more hinges to the top segment; and
    a base support structure affixed to the base housing of the base segment and comprising at least one front foot attached to and extending away from the base housing and constructed using a first material bonded to a second material wherein the at least one front foot is designed to provide a contact mechanism that secures the IHS to a solid surface when the IHS is placed on the solid surface;

the first material includes cavities, at specific respective locations distributed within the first material in order to provide a force of a pre-determined minimum value;

the cavities are defined in-part by the first and second material; and the solid surface corresponds to the cavities.

2. The IHS of claim 1, wherein:

the contact mechanism provides at least one of an adhesive force and a suction force of at least a pre-determined minimum value, which enables the at least one front foot of the IHS to remain in contact with the solid surface and withstand an impact of at least one of (a) a touch interaction force applied to a surface of the display and (b) a radial force used to rotate the top segment away from the base segment to provide viewing and touch interaction access to a user, while accounting for a weight of the top segment relative to a weight of the base segment.

3. The IHS of claim 1, wherein the second material is bonded to the first material using an injection molding procedure by which the second material is molded onto the first material, wherein the second material has a specific level of softness and pliability which provides enhanced surface area contact with the solid surface when a downward force is applied to a corresponding front foot.

4. The IHS of claim 1, wherein:

the first material is plastic and is positioned against a housing surface of the base segment; and the second material is silicon.

5. The IHS of claim 1, wherein:

the first material is plastic and is positioned against the housing surface of the base segment; and the second material is a tactile polymer that coats the first material and provides an adhesive surface that has a pre-determined level of softness and pliability to enable contact with the solid surface using a specific minimum surface area to support enhanced adhesion.

6. The IHS of claim 1, wherein:

the base segment comprises a front border and an opposing back border; and the at least one front foot is positioned within close proximity of the front border and away from the one or more hinges.

7. The IHS of claim 6, wherein:

the base segment comprises a first side border and an opposing second side border;

the at least one front foot comprises a first front foot and a second front foot which are positioned within close proximity of the first side border and the second side border, respectively, and within a pre-determined close proximity of the front border, wherein the second front foot is substantially identically constructed as the first front foot; and the IHS further comprises at least one back foot which is positioned within close proximity of the back border and away from the front border, and the at least one front foot is designed to provide a first suction force or a first adhesive force with the solid surface that is greater than a second suction force or a second adhesive force corresponding to the at least one back foot.

8. A base support structure for an IHS, the base support structure comprising at least one back foot; and at least one front foot constructed using a first material bonded to a second material, wherein the at least one front foot is designed to provide a contact mechanism that secures the IHS to a solid surface when the IHS is placed on the solid surface;

wherein the first material includes cavities, at specific respective locations distributed within the first material in order to provide a force of a pre-determined minimum value when a downward force is applied to a corresponding front foot;

wherein the cavities are defined in-part by the first and second material;

wherein the solid surface corresponds to the cavities;

wherein the at least one front foot and the at least one back foot can be attached to a base housing of a base segment of the IHS, wherein each of the attached feet extends away from the base housing; and wherein the base segment is connected by one or more hinges to the top segment which includes a display of the IHS.

9. The base support structure of claim 8, wherein:

the contact mechanism provides at least one of an adhesive force and a suction force of at least a pre-determined minimum value, which enables the at least one front foot of the IHS to remain in contact with the solid surface and withstand an impact of at least one of (a) a touch interaction force applied to a surface of the display and (b) a radial force used to rotate the top segment away from the base segment to provide viewing and touch interaction access to a user, while accounting for a weight of the top segment relative to a weight of the base segment.

10. The base support structure of claim 8, wherein:

the second material is bonded to the first material using an injection molding procedure, wherein the second material has a specific level of softness and pliability which provides enhanced surface area contact with the solid surface.

11. The base support structure of claim 8, wherein:

the first material is plastic and is positioned against the housing surface of the base segment; and the second material is silicon.

12. The base support structure of claim 8, wherein:

the first material is plastic and is positioned against the housing surface of the base segment; and the second material is a tactile polymer that coats the first material and provides an adhesive surface that has a pre-determined level of softness and pliability to enable contact with the solid surface using a specific minimum surface area to support enhanced adhesion.

13. The base support structure of claim 8, wherein:

the base segment comprises a first side border and an opposing second side border and a front border and an opposing back border;

the at least one front foot is positioned within close proximity of the front border and away from the one or more hinges, and comprises a first front foot and a second front foot which are positioned within close proximity of the first side border and the second side border, respectively, and within a pre-determined close proximity of the front border, wherein the second front foot is substantially identically constructed as the first front foot; and the base support structure further comprises at least one back foot which is positioned within close proximity of the back border and away from the front border, and the at least one front foot is designed to provide a first suction force or a first adhesive force with the solid surface that is greater than a second suction force or a second adhesive force corresponding to the at least one back foot.

14. A method for manufacturing an IHS, the method comprising:
determining a front foot design for the IHS which can provide a contact mechanism that secures the IHS onto a solid surface upon which the IHS can be placed;
injecting a first material used to construct the front foot into a mold which shapes the first material and creates one of a single large scale cavity and multiple micro-cavities within the shaped first material, according to the determined front foot design;
applying heat treatment to a first segment of the molded first material to harden the first segment which is designed to interface with a base housing of the IHS;
coating a second segment of the molded first material with a softer, more pliable, second material to enable enhanced surface area contact with the solid surface when a downward force is applied to a corresponding front foot; and
respectively affixing to the IHS (a) at least one front foot constructed of the molded first material and attached to and extending away from the base housing, wherein the first material is coated with the second material and (b) at least one back foot, which feet are separated by a relative spacing pre-determined to provide a base support structure that minimizes tilting of the IHS.

15. The method of claim 14, wherein said injecting further comprises:
creating within the first material at least one cavity, each having a particular size and positioned at specific respective locations distributed within the first material in order to support a front foot design that can provide the contact mechanism, wherein the contact mechanism is one of at least a pre-determined minimum suction force and at least a predetermined minimum adhesive force, wherein the contact mechanism enables the at least one front foot of the IHS to remain in contact with the solid surface and withstand an impact of at least one of (a) a touch interaction force applied to a surface of the display and (b) a radial force used to rotate the top segment away from the base segment to provide viewing and touch interaction access to a user, while accounting for a weight of the top segment relative to a weight of the base segment.

16. The method of claim 14, wherein:
the at least one front foot is designed to be detachable from the solid surface using a sliding force.

17. The IHS of claim 1, wherein the at least one front foot is designed to be detachable from the solid surface using a sliding force.

18. The base support structure of claim 8, wherein the at least one front foot is designed to be detachable from the solid surface using a sliding force.

19. The IHS of claim 1, wherein the first material is molded to the cavities, each having a particular size and positioned at the specific respective locations.

20. The base support structure of claim 8, wherein the first material is molded to the cavities, each having a particular size and positioned at the specific respective locations.

* * * * *